United States Patent [19]
Yatsuyanagi et al.

[11] Patent Number: 6,077,899
[45] Date of Patent: Jun. 20, 2000

[54] PROCESS FOR PRODUCTION OF RUBBER COMPOSITION

[75] Inventors: Fumito Yatsuyanagi; Hiroyuki Kaido; Tetsuji Kawazura, all of Hiratsuka, Japan

[73] Assignee: The Yokohama Rubber Co., Ltd., Tokyo, Japan

[21] Appl. No.: 08/952,486

[22] PCT Filed: Dec. 12, 1996

[86] PCT No.: PCT/JP96/03635

§ 371 Date: Nov. 19, 1997

§ 102(e) Date: Nov. 19, 1997

[87] PCT Pub. No.: WO97/48766

PCT Pub. Date: Dec. 24, 1997

[30] Foreign Application Priority Data

Jun. 20, 1996 [JP] Japan ................................. 8-159926
Sep. 9, 1996 [JP] Japan ................................. 8-238001

[51] Int. Cl.$^7$ ................................. C08L 9/06; C08L 9/00
[52] U.S. Cl. ..................... 524/495; 524/526; 525/193; 525/197
[58] Field of Search ...................... 524/526, 495; 525/193, 197

[56] References Cited

U.S. PATENT DOCUMENTS 5,834,552  11/1998  Kawazura et al. .................. 524/526

FOREIGN PATENT DOCUMENTS 0 717 075 A1  6/1996  European Pat. Off. .
2-105836  4/1990  Japan .
6-65418  3/1994  Japan .
6-270603  9/1994  Japan .
6-279619  10/1994  Japan .

Primary Examiner—Mark L. Warzel
Attorney, Agent, or Firm—Finnegan, Henderson, Farabow, Garrett & Dunner, L.L.P.

[57] ABSTRACT (i) A starting rubber (A) comprising a terminal-modified and/or coupled diene rubber and having an average glass transition temperature TgA (° C.) is mixed with a specific amount of the reinforcing agent are mixed at a temperature of at least 135° C., followed by adding a starting rubber (B) comprising a terminal unmodified diene rubber and having a specific average glass transition temperature TgB (° C.), and the remaining reinforcing agent and a softening agent; (ii) a starting diene rubber (A') having a specific weight average molecular weight Mw(A') and average glass transition temperature TgA' (° C.) is contacted with a reinforcing agent, followed by adding a starting diene rubber (B') having a specific weight average molecular weight Mw(B) and average glass transition temperature TgB' (° C.), and a softening agent to produce a rubber composition; or (iii) 100 parts by weight of a starting rubber comprising a starting rubber (A") comprising 20 to 100% by weight of a terminal-modified and/or coupled diene rubber and a starting rubber (B") comprising a terminal-unmodified and/or uncoupled rubber are mixed with a specific carbon black (X) in specific amounts at a temperature of at least 135° C., followed by adding the starting rubber (B") and the remaining carbon black and a softening agent.

15 Claims, No Drawings

6,077,899

PROCESS FOR PRODUCTION OF RUBBER COMPOSITION

TECHNICAL FIELD

The present invention relates to a process for producing a rubber composition superior in the tan δ balance of the vulcanizate, more specifically a process for producing a rubber composition useful as a pneumatic tire.

BACKGROUND ART

Improvements have been proposed in the tan δ of tire tread rubber for reducing the fuel consumption of a vehicle. Specifically, separate mixing of ingredients and use of terminal-modified rubber have been proposed.

For example, Japanese Examined Patent Publication (Kokoku) No. 5-1298 discloses a rubber composition further improving the impact resilience and tensile strength of a vulcanizate including a conjugated diene polymer having an aromatic tertiary amino group in the terminal portion of the conjugated diene polymer. On the other hand, Japanese Unexamined Patent Publication (Kokai) No. 55-10434 discloses, during the production of a rubber composition for a tire tread comprising blending a starting rubber composed of an amorphous 1,2-polybutadiene and natural rubber and/or polyisoprene rubber (or additionally including a partially conjugated diene rubber) with carbon black, first mixing a starting rubber containing at least 25% by weight of the 1,2-polybutadiene and the carbon black in a specific ratio, then adding and mixing the remaining starting rubber so as to improve the fuel economy and safety of a car.

Further, Japanese Examined Patent Publication (Kokoku) No. 2-129241 proposes the improvement of the tensile strength and abrasion resistance of the vulcanizate by mixing a terminal-modified conjugated diene polymer with carbon black in an organic solvent.

DISCLOSURE OF INVENTION

The above-mentioned method of separate mixture of ingredients, use of terminal-modified rubber, and other technologies, however, had problems such as the only slight effect in a formulation with a large oil and carbon black content and therefore improvements continued to be demanded. In the case of divided mixing, the technique was only effective for specific combinations of rubbers and the range of possible use are limited. Further, when adopting the method of first mixing the terminal-modified rubber and carbon black and then later adding the emulsion polymerized polymer, while the tan δ balance was improved, there was still the problem that the abrasion resistance fell.

Accordingly, the objects of the present invention are to provide a rubber composition superior in the tan δ balance of the vulcanizate and a process for producing a rubber composition for a tire tread giving a vulcanizate with a superior tan δ balance and improved abrasion resistance.

In accordance with the present invention, there is provided a process for producing a rubber composition characterized by comprising mixing 100 parts by weight of (A) a starting rubber composed of 50 to 90 parts by weight of a starting rubber mixture containing 20 to 80% by weight of a terminal-modified and/or coupled diene rubber and 50 to 10 parts by weight of (B) a starting rubber composed of at least one terminal unmodified diene rubber with 50 to 120 parts by weight of a reinforcing agent and 20 to 80 parts by weight of a softening agent to produce the rubber composition, wherein the average glass transition temperature TgA (° C.) of the starting rubber (A) and the average glass transition temperature TgB (° C.) of the starting rubber (B) have the following relationship:

TgA+20>TgB>TgA−20 and wherein the starting rubber (A) and at least 80% by weight of the total amount of the reinforcing agent are mixed at a temperature of at least 135° C., followed by adding the starting rubber (B), the remaining reinforcing agent and the softening agent.

In accordance with the present invention, there is further provided a process for producing a rubber composition characterized by comprising first mixing 20 to 90 parts by weight of (A') a starting diene rubber having a weight average molecular weight Mw(A') in the range of 100,000 to 1,200,000 with 50 to 120 parts by weight of a reinforcing agent, followed by adding 80 to 10 parts by weight of (B') a starting diene rubber having a weight average molecular weight Mw(B') of at least 400,000 and 20 to 80 parts by weight of a softening agent based upon 100 parts by weight of the total amount of the starting diene rubbers (A') and (B') to produce a rubber composition, wherein the weight average molecular weights are in the following relationship:

$$0.08 \leq Mw(A')/Mw(B') < 1 \tag{III}$$

and wherein the average glass transition temperature TgA' (° C.) of the starting rubber (A') and the average glass transition temperature TgB' (° C.) of the starting rubber (B') are in the following relationship:

$$TgA'+20 > TgB' > TgA'-20 \tag{I'}.$$

In accordance with the present invention, there is further provided a process for producing a rubber composition comprising 100 parts by weight of a starting rubber comprising 50 to 90 parts by weight of (A") a starting rubber containing 20 to 100% by weight of a terminal-modified and/or coupled diene rubber and 50 to 10 parts by weight of (B") a starting rubber composed of at least one terminal unmodified and/or uncoupled starting rubber, 60 to 120 parts by weight of carbon black (X) having a nitrogen adsorption specific area of 130 to 200 m²/g and a DBP oil absorption of 100 to 130 ml/100 g and 20 to 80 parts by weight of a softening agent, the average glass transition temperature TgA" (° C.) of the starting rubber (A") and the average glass transition temperature TgB" (° C.) of the starting rubber (B") being in the following relationship:

TgA"+20>TgB">TgA"−20 comprising mixing the starting rubber (A") with 80 to 100% by weight of the total amount of the reinforcing agent and 50 to 100% by weight of the total amount of the softening agent at a temperature of at least 135° C. in the following relationship:

[Weight of starting rubber (A")/Weight of starting rubber (A")+ starting rubber (B")]/[Weight of 80 to 100% by weight of total amount of carbon black/Weight of 50 to 100% by weight of total amount of softening agent]≦0.7     (IV)

followed by adding and mixing the starting rubber (B") and the remaining carbon black and softening agent to produce the rubber composition.

Further, in accordance with a preferred embodiment of the present invention, there is provided a process for producing a rubber composition according to claim 1 or claim 2, wherein carbon black (Y) having a nitrogen adsorption specific area of 90 to 120 m$^2$/g and a DBP oil absorption of 90 to 120 ml/100 g is mixed with the carbon black (X) to give a total amount of the (X) and (Y) carbon blacks of 60 to 120 parts by weight and the nitrogen adsorption specific areas S(X) and S(Y) of the carbon blacks (X) and (Y) are in the following relationship (V):

40≦carbon black (X)+(S(Y)/S(X))×carbon black (Y)    (V)

the average glass transition temperature TgA" of the starting rubber (A") and the average glass transition temperature TgB" of the starting rubber (B") is in the following range:

20° C.>TgA">-45° C.

the terminal-modified diene rubber of the starting rubber (A") is a styrene-butadiene copolymer rubber and/or polybutadiene rubber obtained by reacting at least 20% of an alkali metal or alkaline earth metal at the terminals of the polymer chain of the rubber molecules of a starting solution polymerized diene rubber with a compound having —CO—N< or —CS—N< bonds in the molecule thereof, while the coupled diene rubber of the starting rubber (A") is a styrene-butadiene copolymer rubber and/or polybutadiene rubber obtained by reacting at least 20% of an alkali metal or alkaline earth metal at the terminals of the polymer chain of the rubber molecules of a starting solution polymerized diene rubber with a tin halide or silicon halide, and the starting rubber (A") is composed of a solution polymerized styrene-butadiene copolymer rubber and the starting rubber (B") is composed of a styrene-butadiene copolymer rubber synthesized by emulsion polymerization.

According to the present invention, further, there is provided a rubber composition for a tire obtained using the above rubber compositions.

The present inventors found that the tan δ of a rubber composition had almost nothing to do with the rubber adsorption phase near the carbon black or other filler and that it was due to the matrix phase and succeeded in improving the tan δ balance by separating the surface of the carbon black from the matrix phase as much as possible.

Therefore, according to the first aspect of the present invention, by mixing in advance the terminal-modified diene rubber (e.g., SBR) having a high reactivity with the surface of the carbon black or other reinforcing agent so that the surface of the carbon was covered by the terminal-modified diene rubber and then adding and mixing the low reactivity diene rubber (e.g., emulsion polymerized SBR), a rubber composition is obtained having an improved tan δ balance of the vulcanizate.

In the second aspect of the present invention, by using two types of starting diene rubber satisfying the above specific relationship (III) and mixing the starting diene rubber (A') and reinforcing agent, then mixing into this the starting diene rubber (B') and a softening agent, a rubber composition is obtained having an improved tan δ balance of the vulcanizate. Note that a ratio of Mw(A')/Mw(B') of less than 0.08 is not desirable since the reinforcement by the reinforcing agent falls, and therefore, the breakage properties and abrasion resistance fall. Conversely, when more than 1 is not preferred since the effect of the reinforcing agent in the matrix phase and the tan δ balance fall.

According to the first aspect of the present invention, it is possible to obtain the desired rubber composition, when producing a rubber composition composing by mixing, into starting rubber composed of 50 to 90 parts by weight, preferably 50 to 80 parts by weight, of a starting rubber (A) including 20 to 80% by weight, preferably 50 to 80% by weight, of a diene rubber which has been synthesized by solution polymerization and terminal modified and/or coupled (e.g., polybutadiene rubber (BR), styrene-butadiene copolymer rubber (SBR), styrene-isoprene-butadiene copolymer rubber (SIBR)) and 50 to 10 parts by weight, preferably 50 to 20 parts by weight, of a diene rubber which has not been terminal modified and/or coupled (e.g., emulsion polymerized or solution polymerized BR, SBR, SIBR), per 100 parts by weight of the starting rubber, 50 to 120 parts by weight, preferably 60 to 100 parts by weight, of a reinforcing agent (for example, carbon black, silica, etc.) and 20 to 80 parts by weight, preferably 35 to 70 parts by weight, of a softening agent (for example, aromatic process oil, naphthene process oil, etc.), having the average glass transition temperature TgA (° C.) of the starting rubber (A) and the average glass transition temperature TgB (° C.) of the starting rubber (B) be in the following relationship:

TgA+20>TgB>TgA-20 preferably,

20>TgA>-45 and

TgA+20>TgB>TgA-10 and mixing the starting rubber (A) and at least 80% by weight, preferably 85 to 100% by weight, of the total amount of the reinforcing agent, first at a temperature of at least 135° C., preferably 130 to 150° C., in for example a Banbury mixer or other hermetically sealed mixer, then mixing the starting rubber (B) and the remaining carbon black and softening agent preferably at a temperature of at least 135° C.

The terminal-modified diene rubber used in the first aspect of the present invention, as described in Japanese Unexamined Patent Publication (Kokai) No. 64-60604, may be obtained by an ordinary method by reacting an alkali metal (e.g., Li) or alkaline earth metal (e.g., Mg) at the terminals of the polymer chain of a solution polymerized SBR, BR, etc. with a compound having a —CO—N< or —CS—N< bond in the molecule (for example, amides such as N,N-diethylformamide, N,N-dimethylacetoamide, N,N-dimethylbenzamide, ureas such as N,N'-dimethyl urea, N,N'-dimethylethylene urea, lactams such as ε-caprolactam, N-methyl-ε-caprolactam, N-methyl-2-pyrrolidone, N-vinyl-2-pyrrolidone, and other compounds, as described in Japanese Unexamined Patent Publication (Kokai) No. 61-103904, 1,3-dimethyl-2-imidazolizine, 1,3- dimethylethylene thiourea, and other compounds, as described in Japanese Unexamined Patent Publication (Kokai) No. 61-268702, etc.) The higher the conversion of the terminals of the polymer chain, the higher the effect and generally those having a conversion of 20% or more are used.

The coupled diene rubber used in the first aspect of the present invention may be obtained by an ordinary method, for example, by reacting an alkali metal or alkaline earth metal at the ends of the rubber molecules of a solution polymerized diene rubber (e.g., SBR, BR, etc.) (or at least 20%, preferably 30 to 50% of the residual end alkali metal or alkaline earth metal of the diene rubber terminal modified by the above method) with, for example, a tin halide or silicon halide by an ordinary method.

As explained above, according to the first aspect of the present invention, by mixing a specific starting diene rubber (A) and, for example, carbon black first at a temperature of at least 135° C. in a first step, it is possible to provide a terminal-modified SBR or other rubber adsorption phase around the carbon black particles. By then blending a starting rubber (B) forming the matrix phase, it is possible to obtain a desired vulcanizate. If the above mixing temperature is less than 135° C., the reaction between the reinforcing agent particles and the terminal-modified (and/or coupled) diene rubber (A) is insufficient and the desired effects cannot be obtained.

According to the second aspect of the present invention, it is possible to produce a rubber composition having a good tan δ balance of the vulcanizate having a weight average molecular weight Mw(A') of a starting diene rubber (A') having a range of molecular weight of 100,000 to 1,200,000, preferably 120,000 to 900,000, and a weight average molecular weight Mw(B') of a starting diene rubber having a range of molecular weight of 400,000 or more, preferably 500,000 to 1,500,000 of the following relationship:

$$0.08 \leq Mw(A')/Mw(B') < 1 \qquad (III)$$

preferably $0.1 \leq Mw(A')/Mw(B') \leq 0.8$ and an average glass transition temperature TgA' (° C.) of the starting rubber (A') and the average glass transition temperature TgB' (° C.) of the starting rubber (B') of the following relationship:

$$TgA'+20>TgB'>TgA'-20 \qquad (I')$$

preferably $$TgA'+20>TgA'-10$$

and $$20>TgA'>-45 \qquad (II')$$

by, first bringing 20 to 90 parts by weight, preferably 50 to 80 parts by weight, of the diene rubber (A) and 50 to 120 parts by weight, preferably 60 to 100 parts by weight, of a reinforcing agent (for example, carbon black, silica, etc.) into contact, then adding 80 to 10 parts by weight, preferably 50 to 20 parts by weight, of the starting diene rubber (B') and 20 to 80 parts by weight, preferably 35 to 70 parts by weight, per 100 parts by weight of a total weight of the starting diene rubber (A') and (B'), of a softening agent (for example, aromatic process oil, naphthene family process oil, etc. As the above starting rubber, a starting rubber dissolved in an organic solvent or a starting rubber made into an aqueous emulsion may be used.

The present inventors succeeded in improving the abrasion resistance by causing the formation of a tight network composed of the polymer/carbon gel at the stage of premixing with the polymer under specific conditions using at least one type carbon black of a certain grade or higher.

Therefore, by the first means, it is possible to provide a rubber composition containing carbon black used for obtaining a rubber composition for a tire tread superior in the tan δ balance of the vulcanized rubber by bringing a starting rubber containing a terminal-modified and/or coupled diene rubber having a high reactivity with carbon black into contact with the carbon black to cover the surface of the carbon black, then add a starting rubber composed of a diene rubber not terminal-modified and/or not coupled and having a low reactivity and, further, possible to obtain a rubber composition containing carbon black used for obtaining a composition for a tire tread improved in the abrasion resistance of the vulcanized rubber by setting the relationship of the content of the mixed starting rubber, carbon black, and softening agent to specific conditions.

As the carbon black used in the third aspect of the present invention, high grade carbon black (X) having a nitrogen adsorption specific area (measured based on ASTM D 3037) of 130 to 200 m$^2$/g and a DBP oil absorption (measured based on JIS K 6221) of 100 to 130 ml/100 g alone or a mixture of two types of carbon black of the carbon black (X) and a carbon black having a nitrogen adsorption specific area of 90 to 120 m$^2$/g and a DBP oil absorption of 90 to 120 mg/100 g—in all cases in the range of 60 to 120 parts by weight, may be used. When the latter mixture of carbon blacks is used, the ratio of blending may be suitably selected, but to give the obtained vulcanized rubber composition abrasion resistance, it is necessary that the carbon black (X) and (Y) be blended so as to satisfy the following relationship when the nitrogen adsorption specific areas thereof are S(X) and S(Y):

$$40 \leq \text{carbon black } (X)+(S(Y)/S(X))\times\text{carbon black } (Y) \qquad (V)$$

According to the third aspect of the present invention, it is possible to obtain the desired rubber composition, when producing a rubber composition comprising by mixing, into 100 parts by weight of the starting rubber composed of 50 to 90 parts by weight, preferably 50 to 80 parts by weight, of a starting rubber (A'') including 20 to 100% by weight, preferably 20 to 80% by weight, most preferably 50 to 80% by weight, of a diene rubber which has been synthesized by solution polymerization and terminal modified and/or coupled (for example, polybutadiene rubber (BR), styrene-butadiene copolymer rubber (SBR), styrene-isoprene-butadiene copolymer rubber (SIBR)) and a starting rubber (B'') comprising 50 to 10 parts by weight, preferably 50 to 20 parts by weight, of at least one diene rubber which has not been terminal modified and/or coupled (for example, emulsion polymerized or solution polymerized BR, SBR, SIBR), 60 to 120 parts by weight, preferably 60 to 100 parts by weight, of carbon black (X) having a nitrogen adsorption specific area of 130 to 200 m$^2$/g and a DBP oil absorption of 100 to 130 ml/100 g alone or a mixture of this carbon black (X) and a carbon black (Y) having a nitrogen specific area of 90 to 120 m$^2$/g and a DBP oil absorption of 90 to 120 ml/100 g and 20 to 80 parts by weight, preferably 35 to 70 parts by weight, of a softening agent (for example, aromatic process oil, naphthene family process oil, etc.), having the average glass transition temperature TgA (° C.) of the starting rubber (A") and the average glass transition temperature TgB (° C.) of the starting rubber (B") be in the following relationship:

TgA"+20>TgB">TgA"−20 preferably,

20>TgA">−45 and

TgA"+20>TgB">TgA"−10 and mixing the starting rubber (A"), 80 to 100% by weight, preferably 85 to 100% by weight, of the total amount of the carbon black, and the softening agent in the following relationship at a temperature of at least 135° C., preferably 130 to 150° C.:

[Weight of starting rubber (A")/Weight of starting rubber (A")+ starting rubber (B")]/[Weight of 80 to 100% by weight of total of carbon black/Weight of 50 to 100% by weight of total of softening agent]≦0.7    (IV)

in a Banbury mixer or other hermetically sealed mixer, then mixing the starting rubber (B") and the remaining carbon black, softening agent, and other ingredients, preferably at a temperature of at least 135° C.

The terminal-modified diene rubber used in the third aspect of the present invention, as described in Japanese Unexamined Patent Publication (Kokai) No. 64-60604, may be obtained by an ordinary method by reacting an alkali metal (for example, Li) or alkaline earth metal (for example, Mg) at the terminals of the polymer chain of a solution polymerized SBR, BR, etc. with a compound having a —CO—N< or —CS—N< bond in the molecule (for example, amides such as N,N-diethylformamide, N,Ndimethylacetoamide, N,N-dimethylbenzamide, ureas such as N,N'-dimethyl urea, N,N'-dimethylethylene urea, lactams such as ε-caprolactam, N-methyl-ε-caprolactam, N-methyl-2-pyrrolidone, N-vinyl-2-pyrrolidone, and other compounds, as described in Japanese Unexamined Patent Publication (Kokai) No. 61-103904, 1,3-dimethyl-2-imidazolizine, 1,3-dimethylethylene thiourea, and other compounds, as described in Japanese Unexamined Patent Publication (Kokai) No. 61-268702, etc.). The higher the conversion of the synthesis ends, the higher the effect, and generally those having a conversion of 20% or more are used.

The coupled diene rubber used in the third aspect of the present invention may be obtained by an ordinary method, for example, by reacting the alkali metal or alkaline earth metal of the terminals of the rubber molecules of a solution polymerized diene rubber (SBR, BR, etc.) (or at least 20%, preferably 30 to 50% of the residual terminal alkali metal or alkaline earth metal of the diene rubber terminal modified by the above method) with, for example, a tin halide or silicon halide by an ordinary method.

As explained above, according to the third aspect of the present invention, by mixing a specific starting diene rubber (A) with specific carbon black first at a temperature of at least 135° C. in the first step, a terminal-modified SBR or other rubber adsorption phase is provided around the carbon black particles. Since the starting rubber (B) forming the matrix phase is blended with this, it is possible to obtain the desired vulcanizate. If the above mixing temperature is less than 135° C., the reaction between the carbon particles and terminal-modified (and/or coupled) diene rubber (A) is insufficient and the desired effect cannot be obtained.

It is possible to add, to the rubber compositions of the first to third aspects of the present invention, in addition to the above polymers, reinforcing agents, and softening agents, sulfur, a vulcanization accelerator, an antioxidant, other fillers, a plasticizer, and other various additives generally blended into rubber compositions for automobile tire use. The amounts of these additives may be made the general amounts as well. For example, the amount of sulfur added may be at least 0.5 part by weight, more preferably 1.0 to 2.5 parts by weight, per 100 parts by weight of the rubber component. The vulcanization conditions also are in the general range. These additives are generally added after the completion of the first step and the second step, but the invention is not limited to this.

EXAMPLES

The present invention will be further illustrated by, but is by no means limited to, the following Examples.

Examples I-1 to I-2 and Comparative Examples I-1 to I-4

Example I-1 and Comparative Examples I-1 to I-2 evaluate the vulcanizate properties in the case of use of SBR-1 (terminal-modified/coupled solution polymerized styrene-butadiene copolymer having glass transition temperature of −30° C., bound styrene content of 20%, vinyl content of 65%, weight average molecular weight of 350,000) and SBR-2 (33.3% oil-extended emulsion polymerized styrene-butadiene copolymer having glass transition temperature of −21° C., bound styrene content of 45%, vinyl content of 12%, and weight average molecular weight of 1,200,000) as starting rubbers and blending in the other ingredients shown in Table I-1. The results are shown in Table I-1 as well.

The vulcanizate property (tan δ) was measured as described below.

A Toyo Seiki Seisakusho Rheograph Solid was used to measure the viscoelasticity at an initial stress of 10%, a dynamic stress of 2%, and a frequency of 20 Hz (sample width of 5 mm and temperatures of 0° C. and 40° C.)

Note that in the vulcanizate properties, the higher than tan δ at 0° C., the greater the frictional force on wet road surfaces (the higher the grid of the tire), while the lower the tan δ at 40° C., the smaller the energy loss in fixed energy deformation (the smaller the rolling resistance of the tire). In the present invention, the evaluation is by the value of the tan δ (0° C.)/tan δ (40° C.) (shown in the Table as (a)/(b)). The larger this value, the better the tan δ balance (that is, a high grip of the tire and small rolling resistance).

Comparative Example I-1 (Standard Example) uses the same rubber compositions in both steps. Example I-1 charged all of the oil-extended emulsion polymerized SBR in the second step. The tan δ at 40° C. fell about 10%, the temperature gradient of the tan δ increased, and it was possible to maintain the tire grip and reduce the fuel consumption. On the other hand, Comparative Example I-2 charged 30 parts by weight of the modified solution polymerized SBR in the second step. In contrast to Example I-1, the temperature gradient of the tan δ deteriorated.

Example I-2 and Comparative Examples I-3 to I-4 are Examples of use of 70 parts by weight of SBR-1 (terminal-modified/coupled solution polymerized styrene-butadiene copolymer having glass transition temperature of −30° C., bound styrene content of 20%, vinyl content of 65%, weight average molecular weight of 350,000) and 30 parts by weight of SBR-2 (33.3% oil-extended emulsion polymerized styrene-butadiene copolymer having glass transition temperature of −36° C., bound styrene content of 33%, vinyl bond content of 13%, and weight average molecular weight of 720,000) as the starting rubbers. In these Examples as well, like the above Examples, Example I-2 of the present invention showed an effect of improvement of the tan δ compared with Comparative Example I-3 (Standard Example) and Comparative Example I-4.

difference of Tg of these starting rubbers was 60° C. and the requirements of the present invention were not satisfied. Even if the non-modified oil extended emulsion polymerized SBR is charged in the second step, no effect of improvement in the tan δ can be recognized.

Examples I-3 to I-4 and Comparative Example I-7 (Standard Example) and Comparative Example I-8 are Examples of use of 60 parts by weight of SBR-4 (terminal-modified/coupled solution polymerized styrene-butadiene polymer having glass transition temperature of −25° C., bound styrene content of 15%, vinyl content of 80%, and weight average molecular weight of 350,000) and 40 parts by weight of the above SBR-2 as the starting rubbers for formulation as shown in Table I-2.

Comparative Example I-7 (Standard Example) had all of the starting rubber charged in the first step, while Comparative Example I-8 (Standard Example) used the same rubber composition in step 1 and step 2. Looking at the effects of

TABLE I-1

|  | Comp. Ex. I-1*1 | Ex. I-1 | Comp. Ex. I-2 | Comp. Ex. I-3*1 | Ex. I-2 | Comp. Ex. I-4 |
|---|---|---|---|---|---|---|
| Formulation |  |  |  |  |  |  |
| 1st step (temp. 140° C.) |  |  |  |  |  |  |
| SBR-1 | 49 | 70 | 40 | 49 | 70 | 40 |
| SBR-2 | 31.5 | — | 45 | — | — | — |
| SBR-3 | — | — | — | 31.5 | — | 45 |
| Carbon black 1 | 60 | 60 | 60 | 60 | 60 | 60 |
| Zinc oxide | 3 | 3 | 3 | 3 | 3 | 3 |
| Stearic acid | 2 | 2 | 2 | 2 | 2 | 2 |
| Antioxidant (6C) | 3 | 3 | 3 | 3 | 3 | 3 |
| Aromatic process oil | 20 | 20 | 20 | 20 | 20 | 20 |
| 2nd step (temp. 135° C.) |  |  |  |  |  |  |
| SBR-1 | 21 | — | 30 | 21 | — | 30 |
| SBR-2 | 13.5 | 45 | — | — | — | — |
| SBR-3 | — | — | — | 13.5 | 45 | — |
| Final step (temp. 70° C.) |  |  |  |  |  |  |
| Sulfur | 2 | 2 | 2 | 2 | 2 | 2 |
| Vulcanization accelerator (DPG) | 0.5 | 0.5 | 0.5 | 0.5 | 0.5 | 0.5 |
| Vulcanization accelerator (CZ) | 0.7 | 0.7 | 0.7 | 0.7 | 0.7 | 0.7 |
| Vulcanizate properties |  |  |  |  |  |  |
| (a) tan δ (0° C.) | 1.03 | 1.08 | 1.02 | 0.88 | 0.90 | 0.89 |
| (b) tan δ (40° C.) | 0.31 | 0.28 | 0.32 | 0.27 | 0.25 | 0.27 |
| Temperature gradient |  |  |  |  |  |  |
| (a)/(b) | 3.3 | 3.9 | 3.2 | 3.3 | 3.6 | 3.3 |

*1: Standard example

Examples I-3 to I-4 and Comparative Examples I-5 to I-8

Comparative Example I-5 (Standard Example) and Comparative Example I-6 are Examples of use of 70 parts by weight of the above SBR-1 and 30 parts by weight of BR-1 (solution polymerized butadiene polymer having cis content of 30%, vinyl content of 13%, and weight average molecular weight of 300,000) formulated as shown in Table II. The the differences in mixing methods of the two components, as shown in Table I-2, in the method for additionally adding the starting rubber in step 2, an effect of reduction of the tan δ at 40° C. arose, but the tan δ at 0° C. falls and no improvement was observed in the temperature gradient of the tan δ.

On the other hand, in Examples I-3 and I-4 of the present invention, as shown in Table I-2, the tan δ at 40° C. fell and the temperature gradient of the tan δ was improved.

TABLE I-2

| | Comp. Ex. I-5*[1] | Comp. Ex. I-6 | Comp. Ex. I-7*[1] | Comp. Ex. I-8*[1] | Ex. I-3 | Ex. I-4 |
|---|---|---|---|---|---|---|
| Formulation | | | | | | |
| 1st step (temp. 140° C.) | | | | | | |
| SBR-1 | 49 | 70 | — | — | — | — |
| BR-1 | 21 | — | — | — | — | — |
| SBR-4 | — | — | 40 | 24 | 40 | 40 |
| SBR-2 | — | — | 90 | 54 | 75 | 60 |
| Carbon black 1 | 60 | — | — | — | — | — |
| Carbon black 2 | — | — | 100 | 100 | 100 | 100 |
| Zinc oxide | 3 | 3 | 3 | 3 | 3 | 3 |
| Stearic acid | 2 | 2 | 2 | 2 | 2 | 2 |
| Antioxidant (6C) | 3 | 3 | 3 | 3 | 3 | 3 |
| Aromatic process oil | 20 | 20 | 40 | 40 | 40 | 40 |
| 2nd step (temp. 135° C.) | | | | | | |
| SBR-1 | 21 | — | — | — | — | — |
| BR-1 | 9 | 30 | — | — | — | — |
| SBR-4 | — | — | — | 16 | — | — |
| SBR-2 | — | — | — | 36 | 15 | 30 |
| Final step (temp. 70° C.) | | | | | | |
| Sulfur | 2 | 2 | 2.5 | 2.5 | 2.5 | 2.5 |
| Vul. accelerator (DPG) | 0.5 | 0.5 | 1 | 1 | 1 | 1 |
| Vul. accelerator (CZ) | 0.7 | 0.7 | 1 | 1 | 1 | 1 |
| Vulcanizate properties | | | | | | |
| (a) tan δ (0° C.) | 0.54 | 0.5 | 1.04 | 1.00 | 1.01 | 1.07 |
| (b) tan δ (40° C.) | 0.25 | 0.2 | 0.58 | 0.56 | 0.51 | 0.49 |
| Temperature gradient | | | | | | |
| (a)/(b) | 2.2 | 2.1 | 1.8 | 1.8 | 2.0 | 2.2 |

*[1]: Standard example

Example I-3 is an Example of SBR-1 (terminal-modified/coupled solution polymerized styrene-butadiene polymer having glass transition temperature of −30° C., bound styrene content of 20%, vinyl content of 65%, and weight average molecular weight of 350,000), SBR-2 (33.3% oil extended emulsion polymerized styrene-butadiene polymer having glass transition temperature of −21° C., bound styrene content of 45%, vinyl content of 12%, and weight average molecular weight of 1,200,000), and SBR-5 (33.3% oil extended emulsion polymerized styrene-butadiene polymer having glass transition temperature of −36° C., bound styrene content of 35%, vinyl content of 14%, and weight average molecular weight of 820,000).

Comparative Example I-9 is an Example where all of the ingredients except for the vulcanization system are added in the first step, while Comparative Examples I-10 and I-11 are Examples where, opposite to the present invention, the modified solution polymerized SBR is added in the second step. As shown in Table I-3, Example I-5 of the present invention, compared with Comparative Example I-9, showed a higher tan δ at 0° C. and a lower tan δ at 40° C., a larger tan δ gradient, and both a maintained tire grip and a lower fuel consumption. Further, compared with Comparative Example I-10, where the modified solution polymerized SBR was added in the second step, in Comparative Example I-9, the tan δ at 0° C. fell and the tan δ at 40° C. rose so deterioration was shown. The same was true for Example I-6 and Comparative Example I-11.

TABLE I-3

| | Comp. Ex. I-9*[1] | Comp. Ex. I-10 | Ex. I-5 | Comp. Ex. I-11 | Ex. I-6 |
|---|---|---|---|---|---|
| Formulation | | | | | |
| 1st step (temp. 140° C.) | | | | | |
| SBR-1 | 70.0 | 40.0 | 70.0 | 40.0 | 70.0 |
| SBR-2 | 45.0 | 45.0 | — | — | — |
| SBR-5 | — | — | — | 45.0 | — |
| Carbon black 2 | 60.0 | 60.0 | 60.0 | 60.0 | 60.0 |
| Zinc oxide | 3.0 | 3.0 | 3.0 | 3.0 | 3.0 |
| Stearic acid | 2.0 | 2.0 | 2.0 | 2.0 | 2.0 |
| Antioxidant (6C) | 5.0 | 5.0 | 5.0 | 5.0 | 5.0 |
| Aromatic process oil | 30.0 | 30.0 | 30.0 | 30.0 | 30.0 |
| 2nd step (temp. 135° C.) | | | | | |
| SBR-1 | — | 30.0 | — | 30.0 | — |
| SBR-2 | — | — | 45.0 | — | — |
| SBR-5 | — | — | — | — | 45.0 |
| Final step (temp. 70° C.) | | | | | |
| Sulfur | 2.0 | 2.0 | 2.0 | 2.0 | 2.0 |
| Vul. accelerator CZ | 2.0 | 2.0 | 2.0 | 2.0 | 2.0 |
| Vulcanizate properties | | | | | |
| (a) tan δ (0° C.) | 1.04 | 1.04 | 1.10 | 0.89 | 0.92 |
| (b) tan δ (40° C.) | 0.40 | 0.43 | 0.36 | 0.35 | 0.32 |
| Temperature gradient | | | | | |
| (a)/(b) | 2.6 | 2.4 | 3.1 | 2.5 | 2.9 |

*[1]: Standard example

Note that the ingredients shown in Tables I-1 to I-3 were as follows:

SBR-1: A terminal-modified and coupled solution polymerized styrene-butadiene copolymer having a glass transition temperature of −30° C., a bound styrene content of 20%, a vinyl content of 65%, a weight average molecular weight of 350,000

SBR-2: A 33.3% oil-extended emulsion polymerized styrene-butadiene copolymer having a glass transition temperature of −21° C., a bound styrene content of 45%, a vinyl content of 12%, and a weight average molecular weight of 1,200,000

SBR-3: A 33.3% oil-extended emulsion polymerized styrene-butadiene copolymer having a glass transition temperature of −36° C., a bound styrene content of 33%, a vinyl content of 13%, and a weight average molecular weight of 720,000.

SBR-4: A terminal-modified/coupled solution polymerized styrene-butadiene copolymer having a glass transition temperature of −25° C., a bound styrene content of 15%, a vinyl content of 80%, and a weight average molecular weight of 350,000.

SBR-5: A 33.3% oil-extended emulsion polymerized styrene-butadiene copolymer having a glass transition temperature of −36° C., a bound styrene content of 35%, a vinyl content of 14%, and a weight average molecular weight of 820,000.

BR-1: A solution polymerized butadiene polymer having a glass transition temperature of −90° C., a cis content of 30%, a vinyl content of 13%, and a weight average molecular weight of 300,000.

Carbon black 1: Nitrogen adsorption specific area of 117 $m^2/g$ and DBP oil absorption of 112 ml/100 g.

Carbon black 2: Nitrogen adsorption specific area of 150 $m^2/g$ and DBP oil absorption of 127 ml/100 g.

Zinc white: Zinc White No. 3

Stearic acid: Industrial stearic acid

Antioxidant 6C: N-phenyl-N'-(1,3-dimethylbutyl)-p-phenylenediamine

Aromatic oil: Aromatic process oil

Powdered sulfur: 5% oil treated powdered sulfur

Vulcanization accelerator CZ: N-cyclohexyl-2-benzothiazylsulfenamide

Vulcanization accelerator DPG: Diphenylguanidine

Examples II-1 to II-7 and Comparative Examples II-1 to II-6

(Ingredients)

The ingredients used in the formulations of the Examples of Examples II-1 to II-7 and Comparative Examples II-1 to II-6 were as follows:

SBR 1: A terminal-modified and coupled solution polymerized styrene-butadiene copolymer having a glass transition temperature of −30° C., a bound styrene content of 20%, a vinyl content of 65%, a weight average molecular weight of 350,000, and a coupling rate of 75%.

SBR 2: A 33.3% oil-extended emulsion polymerized styrene-butadiene copolymer having a glass transition temperature of −21° C., a bound styrene content of 45%, a vinyl content of 12%, and a weight average molecular weight of 1,200,000

SBR 3: A terminal-modified/coupled solution polymerized styrene-butadiene copolymer having a glass transition temperature of −25° C., a bound styrene content of 15%, a vinyl content of 75%, a weight average molecular weight of 350,000, and a coupling rate of 70%.

Carbon black 1: Nitrogen adsorption specific area of 150 $m^2/g$ and DBP oil absorption of 127 ml/100 g.

Carbon black 2: Nitrogen adsorption specific area of 117 $m^2/g$ and DBP oil absorption of 112 ml/100 g.

Zinc white: Zinc White No. 3

Stearic acid: Industrial stearic acid

Antioxidant 6C: N-phenyl-N'-(1,3-dimethylbutyl)-p-phenylenediamine

Aromatic oil: Aromatic process oil

Powdered sulfur: 5% oil treated powdered sulfur

Vulcanization accelerator CZ: N-cyclohexyl-2-benzothiazylsulfenamide (Preparation of Samples)

The samples used for the measurements in Examples II-1 to II-7 and Comparative Examples II-1 to II-6 were prepared as follows:

In the case of two-step mixture, the first step consisted of mixing all ingredients except for the vulcanization accelerator and sulfur by a 1.8 liter hermetically sealed mixer for 3 to 4 minutes, then discharging it when reaching 150±5° C. and the second step of mixing this master batch with the remaining ingredients in a 1.8 liter hermetically sealed mixer for 3 to 5 minutes and discharging it when reaching 165±5° C. The vulcanization accelerator and sulfur were mixed with the second step master batch by an 8-inch open roll to obtain the rubber composition. In the case of one-step mixture, all of the ingredients, other than the vulcanization accelerator and sulfur, were mixed in a 1.8 liter hermetically sealed mixer for 3 to 4 minutes and discharged when reaching 165±5° C. The vulcanization accelerator and sulfur were added to the master batch by an open roll to obtain the rubber composition.

Next, the composition was press vulcanized in a 15×15×0.2 cm mold at 160° C. for 20 minutes to prepare the targeted test pieces and obtain samples for evaluation of the vulcanizate properties.

(Test Methods)

The test methods for the vulcanizate properties of the compositions obtained in Examples II-1 to II-7 and Comparative Examples II-1 to II-6 were as follows:

Vulcanizate Properties 1) 300% deformation stress and breakage strength: Measured based on JIS K 6251 (Dumbbell shape no. 3).

2) tan δ: Measured by Toyo Seiki Seisakusho Rheograph Solid viscoelasticity device at 20 Hz, initial elongation of 10%, and dynamic stress of 2% (measured with sample width of 5 mm at temperatures of 0° C. and 60° C.).

3) Abrasion resistance: Measured by Lambourn abrasion tester and indexed to amount of abrasion loss as follows:

Abrasion resistance (index)=Loss at reference test piece/Loss at individual test pieces×100

However, the reference test pieces were calculated as Comparative Examples II-1 and II-6 in Tables II-1 to II-2.

Examples II-1 to II-4 and Comparative Examples II-1 to II-5

Examples II-1 to II-4 and Comparative Examples II-1 to II-5 evaluate the vulcanizate properties in the case of use of SBR 1 (terminal-modified/coupled solution polymerized styrene-butadiene copolymer having glass transition temperature of −30° C., bound styrene content of 20%, vinyl content of 65%, weight average molecular weight of 350,000, coupling rate of 75%) and SBR 2 (33.3% oil-extended emulsion polymerized styrene-butadiene copolymer having glass transition temperature of −21° C., bound styrene content of 45%, vinyl content of 12%, and weight average molecular weight of 1,200,000) as starting rubbers and blending in the other ingredients shown in Table II-1. The results are shown in the following Table II-1.

Examples II-5 to II-7 and Comparative Example II-6

Examples II-5 to II-7 and Comparative Example II-6 evaluate the vulcanizate properties in the case of use of SBR 3 (terminal-modified/coupled solution polymerized styrene-butadiene copolymer having a glass transition temperature of −25° C., bound styrene content of 15%, vinyl content of 75%, weight average molecular weight of 350,000, coupling rate of 70%) and SBR 2 (33.3% oil-extended emulsion

TABLE II-1

|  | Comp. Ex. II-1 | Comp. Ex. II-2 | Comp. Ex. II-3 | Comp. Ex. II-4 | Ex. II-1 | Ex. II-2 | Ex. II-3 | Ex. II-4 | Comp. Ex. II-5 |
|---|---|---|---|---|---|---|---|---|---|
| (1st step) | | | | | | | | | |
| SBR 1 | 70.0 | 70.0 | 70.0 | 70.0 | 65.0 | 60.0 | 55.0 | 50.0 | 40.0 |
| SBR 2 | 45.0 | 45.0 | 45.0 | — | — | — | — | — | 45.0 |
| Carbon black 1 | — | 10.0 | 20.0 | — | 7.0 | 10.0 | 15.0 | 20.0 | — |
| Carbon black 2 | 60.0 | 50.0 | 40.0 | 60.0 | 53.0 | 50.0 | 45.0 | 40.0 | 60.0 |
| Zinc oxide | 3.0 | 3.0 | 3.0 | 3.0 | 3.0 | 3.0 | 3.0 | 3.0 | 3.0 |
| Stearic acid | 2.0 | 2.0 | 2.0 | 2.0 | 2.0 | 2.0 | 2.0 | 2.0 | 2.0 |
| Antioxidant 6C | 5.0 | 5.0 | 5.0 | 5.0 | 5.0 | 5.0 | 5.0 | 5.0 | 5.0 |
| Aromatic oil | 30.0 | 30.0 | 30.0 | 30.0 | 27.5 | 25.0 | 22.5 | 20.0 | 30.0 |
| Powdered sulfur | 2.0 | 2.0 | 2.0 | 2.0 | 2.0 | 2.0 | 2.0 | 2.0 | 2.0 |
| Vul. accelerator CZ | 1.5 | 1.5 | 1.5 | 1.5 | 1.5 | 1.5 | 1.5 | 1.5 | 1.5 |
| (2nd step) | | | | | | | | | |
| SBR1 | — | — | — | — | — | — | — | — | 30.0 |
| SBR2 | — | — | — | 45.0 | 52.5 | 60.0 | 67.5 | 75.0 | — |
| Coefficient 1 of (V) | 37 | 41 | 45 | 37 | 40 | 41 | 43 | 45 | 37 |
| Coefficient 2 of (IV) | 0.75 | 0.75 | 0.75 | 0.35 | 0.30 | 0.25 | 0.21 | 0.17 | 0.53 |
| Vulcanizate property | | | | | | | | | |
| 300% deformation stress (MPa) | 7.9 | 7.5 | 7.3 | 9.1 | 8.7 | 8.0 | 7.5 | 7.1 | 9.1 |
| Breakage strength (MPa) | 16.5 | 16.2 | 16.3 | 18.2 | 16.9 | 17.4 | 17.4 | 17.8 | 18.3 |
| tan δ (0° C.) | 1.077 | 1.050 | 1.044 | 1.148 | 1.067 | 1.141 | 1.156 | 1.147 | 1.017 |
| tan δ (60° C.) | 0.237 | 0.265 | 0.279 | 0.313 | 0.215 | 0.222 | 0.230 | 0.233 | 0.258 |
| tan δ gradient (0° C./60° C.) | 4.54 | 3.96 | 3.74 | 5.39 | 4.96 | 5.14 | 6.03 | 4.92 | 3.94 |
| Abrasion resistance index | 100 | 97 | 100 | 100 | 105 | 106 | 108 | 124 | 96 |

From the results of Table II-1, it is clear that the rubber compositions of Examples II-1 to II-4 satisfies all the requirements defined in the present invention, the requirements of formulas IV and V are satisfied, the tan δ balance is good, and the abrasion resistance is excellent. As opposed to this, as shown in Comparative Examples II-2 and II-3, even when a predetermined amount of carbon black 1 is mixed with Comparative Example II-1, when separate mixing of the rubber ingredients of SBR 1 and SBR 2 is not adopted and not satisfying the requirements of formula V, the tan δ balance is poor and the abrasion resistance is not improved. Further, as in Comparative Example II-4, when a high grade of carbon black, that is, carbon black 1, is not used, even when separate mixing of the rubber ingredients of SBR 1 and 2 is adopted, the requirements of formulas IV and V are not satisfied and while the tan δ balance may be good, the abrasion resistance is not improved. Further, as in Comparative Example II-5, when a high grade of carbon black, that is, carbon black 1, is not used, even when the SBR 1 and 2 are mixed in the first step and separate mixing of the rubber ingredient for SBR 1 is adopted in the second step, the requirements of formula IV are not satisfied and, as a result, both of the tan δ balance and abrasion resistance are poor.

polymerized styrene-butadiene copolymer having a glass transition temperature of −21° C., bound styrene content of 45%, vinyl content of 12%, and weight average molecular weight of 1,200,000) as the starting rubbers and mixed with the other ingredients shown in Table II-2. The results are shown in the following Table II-2.

TABLE II-2

|  | Comp. Ex. II-6 | Ex. II-5 | Ex. II-6 | Ex. II-7 |
|---|---|---|---|---|
| (1st step) | | | | |
| SBR 3 | 40.0 | 40.0 | 40.0 | 40.0 |
| SBR 2 | 90.0 | 65.0 | 40.0 | 30.0 |
| Carbon black 1 | 100.0 | 100.0 | 100.0 | 100.0 |
| Zinc oxide | 3.0 | 3.0 | 3.0 | 3.0 |
| Stearic acid | 2.0 | 2.0 | 2.0 | 2.0 |
| Antioxidant 6C | 3.0 | 3.0 | 3.0 | 3.0 |
| Aromatic oil | 45.0 | 43.0 | 45.0 | 50.0 |
| Powdered sulfur | 3.0 | 3.0 | 3.0 | 3.0 |
| Vul. accelerator CZ | 2.0 | 2.0 | 2.0 | 2.0 |
| (2nd step) | | | | |
| SBR 2 | — | 25.0 | 45.0 | 60.0 |
| Coefficient 1 of (V) | 100 | 100 | 100 | 100 |
| Coefficient 2 of (IV) | 0.75 | 0.55 | 0.39 | 0.36 |

TABLE II-2-continued

|  | Comp. Ex. II-6 | Ex. II-5 | Ex. II-6 | Ex. II-7 |
|---|---|---|---|---|
| Vulcanizate property |  |  |  |  |
| 300% deformation stress (MPa) | 7.6 | 8.1 | 7.9 | 8.0 |
| Breakage strength (MPa) | 16.2 | 16.5 | 16.4 | 16.7 |
| tan δ (0° C.) | 0.930 | 0.951 | 0.974 | 0.981 |
| tan δ (60° C.) | 0.495 | 0.489 | 0.481 | 0.473 |
| tan δ gradient (0° C./60° C.) | 1.88 | 1.95 | 2.02 | 2.07 |
| Abrasion resistance index | 100 | 106 | 116 | 123 |

From the results shown in Table II-2, it is clear that the rubber compositions of Examples II-5 to II-7 satisfies all the requirements defined in the present invention, the requirements of formulas IV and V are satisfied, the tan δ balance is good, and the abrasion resistance is excellent. As opposed to this, as in Comparative Example II-6, even when SBR 3 with its excellent reactivity with carbon is used together with SBR 2 and the carbon black 1 is used, which is a high grade of carbon black, when these components are mixed together with the other ingredients, the requirements of formula V are not satisfied and both of the tan δ balance and abrasion resistance are inferior to those of the Examples.

Industrial Applicability

As explained above, according to the first and second aspects of the present invention, it is possible to obtain the effects of an improvement in the tan δ balance, a reduction in the fuel consumption using a general use HPT type tire tread in which the effect of use was not sufficient with conventional end-modified SBR, and the tan δ can be reduced to a level of solution polymerization using an inexpensive emulsion polymerization SBR. Further, according to the third aspect of the present invention, it is possible to obtain a rubber composition which is improved in the tan δ balance and further is improved in the abrasion resistance as well and possible to provide a tire with superior properties enabling lower fuel consumption by use of this for a rubber composition for a tire tread.

We claim:

1. A process for producing a rubber composition comprising mixing 100 parts by weight of (A) a starting rubber composed of 50 to 90 parts by weight of a starting rubber mixture containing 20 to 80% by weight of a terminal-modified and/or coupled diene rubber and 50 to 10 parts by weight of (B) a starting rubber composed of at least one terminal unmodified diene rubber with 50 to 120 parts by weight of a reinforcing agent and 20 to 80 parts by weight of a softening agent to produce the rubber composition, wherein the average glass transition temperature TgA (° C.) of the starting rubber (A) and the average glass transition temperature TgB (° C.) of the starting rubber (B) have the following relationship:

$$TgA+20>TgB>TgA-10 \quad (I)$$

and wherein the starting rubber (A) and at least 80% by weight of the total amount of the reinforcing agent are mixed at a temperature of at least 135° C., followed by adding the starting rubber (B), the remaining reinforcing agent and the softening agent.

2. A process for producing a rubber composition as claimed in claim 1, wherein the average glass transition temperature TgA (° C.) of the starting rubber (A) is in the following range:

$$20>TgA>-45 \quad (II)$$

.

3. A process for producing a rubber composition as claimed in claim 1 or 2, wherein the starting terminal-modified diene rubber of the starting rubber (A) is a styrene-butadiene copolymer rubber and/or a polybutadiene rubber obtained by reacting at least 20% of an alkali metal or alkaline earth metal at the terminals of the polymer chain of the rubber molecules of a solution polymerized starting diene rubber with a compound having —CO—N< or —CS—N< bond in the molecule thereof.

4. A process for producing a rubber composition as claimed in claim 1 or 2, wherein the coupled diene rubber of the starting rubber (A) is a styrene-butadiene copolymer rubber and/or polybutadiene rubber obtained by reacting at least 20% of an alkali metal or alkaline earth metal at the terminals of the polymer chain of the rubber molecules of a solution polymerized starting diene rubber with a tin halide or silicon halide.

5. A process for producing a rubber composition as claimed in claim 1 or 2, wherein the starting rubber (A) is composed of a solution polymerized styrene-butadiene copolymer rubber and the starting rubber (B) is composed of a styrene-butadiene copolymer rubber synthesized by emulsion polymerization.

6. A process for producing a rubber composition comprising first mixing 20 to 90 parts by weight of (A') a starting diene rubber having a weight average molecular weight Mw(A') in the range of 100,000 to 1,200,000 with 50 to 120 parts by weight of a reinforcing agent, followed by adding 80 to 10 parts by weight of (B') a starting diene rubber having a weight average molecular weight Mw(B') of at least 400,000 and 20 to 80 parts by weight of a softening agent based upon 100 parts by weight of the total amount of the starting diene rubbers (A') and (B') to produce a rubber composition, wherein the weight average molecular weights are in the following relationship:

$$0.08 \leq Mw(A')/Mw(B')<1 \quad (III)$$

and wherein the average glass transition temperature TgA' (°C.) of the starting rubber (A') and the average glass transition temperature TgB' (° C.) of the starting rubber (B') are in the following relationship:

$$TgA'+20>TgB'>TgA'-10 \quad (I').$$

7. A process for producing a rubber composition as claimed in claim 6, wherein the average glass transition temperature TgA' (°C.) of the starting rubber (A') is in the following range:

$$20>TgA'>-45 \quad (II').$$

8. A rubber composition for a tire obtained by a production process according to claim 1 or 6.

9. A process for producing a rubber composition comprising 100 parts by weight of a starting rubber comprising 50 to 90 parts by weight of (A") a starting rubber containing 20 to 100% by weight of a terminal-modified and/or coupled diene rubber and 50 to 10 parts by weight of (B") a starting rubber composed of at least one terminal unmodified and/or uncoupled starting rubber, 60 to 120 parts by weight of carbon black (X) having a nitrogen adsorption specific area of 130 to 200 m$^2$/g and a DBP oil absorption of 100 to 130 ml/100 g and 20 to 80 parts by weight of a softening agent, the average glass transition temperature TgA" (° C.) of the starting rubber (A") and the average glass transition temperature TgB" (° C.) of the starting rubber (B") being in the following relationship:

TgA"+20>TgB">TgA"−10 comprising mixing the starting rubber (A") with 80 to 100% by weight of the total amount of the reinforcing agent and 50 to 100% by weight of the total amount of the softening agent at a temperature of at least 135° C. in the following relationship:

((Weight of starting rubber (A")/Weight of starting rubber (A")+ starting rubber (B")))/((Weight of 80 to 100% by weight of total amount of carbon black/Weight of 50 to 100% by weight of total amount of softening agent))≦0.7    (IV)

followed by adding and mixing the starting rubber (B") and the remaining carbon black and softening agent to produce the rubber composition.

10. A process for producing a rubber composition as claimed in claim 9, wherein carbon black (Y) having a nitrogen adsorption specific area of 90 to 120 m$^2$/g and a DBP oil absorption of 90 to 120 ml/100 g is mixed with said carbon black (X) such that a total amount of the carbon blacks (X) and (Y) of 60 to 120 parts by weight and the nitrogen adsorption specific areas S(X) and S(Y) of the carbon blacks (X) and (Y) are in the following relationship:

40≦carbon black (X)+(S(Y)/S(X))×carbon black (Y)    (V)

11. A process for producing a rubber composition as claimed in claim 9 or 10, wherein the average glass transition temperature TgA" of the starting rubber (A") and the average glass transition temperature TgB" of the starting rubber (B") is in the following range:

20° C.>TgA">−45° C.

12. A process for producing a rubber composition as claimed in claim 9 or 10, wherein the terminal-modified diene rubber of the starting rubber (A") is a styrene-butadiene copolymer rubber and/or polybutadiene rubber obtained by reacting at least 20% of an alkali metal or alkaline earth metal at the terminals of the polymer chain of the rubber molecules of a solution polymerized starting diene rubber with a compound having —CO—N< or —CS—N< bonds in the molecule thereof.

13. A process for producing a rubber composition as claimed in claim 9 or 10, wherein the coupled diene rubber of the starting rubber (A") is a styrene-butadiene copolymer rubber and/or polybutadiene rubber obtained by reacting at least 20% of an alkali metal or alkaline earth metal at the terminals of the polymer chain of the rubber molecules of a solution polymerized diene rubber with a tin halide or silicon halide.

14. A rubber composition according to claim 9 or 10, wherein the starting rubber (A") is composed of a solution polymerized styrene-butadiene copolymer rubber and the starting rubber (B") is composed of a styrene-butadiene copolymer rubber synthesized by emulsion polymerization.

15. A rubber composition for a tire obtained using a rubber composition produced by a process according to claim 9 or 10.

* * * * *